United States Patent [19]

Doi et al.

[11] 3,901,873

[45] Aug. 26, 1975

[54] PROCESS FOR THE PRODUCTION OF AGAR FROM A RED ALGA

[75] Inventors: Shuji Doi, Chigasaki; Tomiji Saito, Kawasaki; Shigenobu Tozaki, Fujisawa, all of Japan

[73] Assignee: Meiji Seika Kaisha, Ltd., Tokyo, Japan

[22] Filed: Feb. 8, 1973

[21] Appl. No.: 330,688

[30] Foreign Application Priority Data
Feb. 14, 1972 Japan.................................. 47-14788

[52] U.S. Cl............................................. 260/209 R
[51] Int. Cl............................................. C07g 3/00
[58] Field of Search................................. 260/209 R

[56] References Cited
UNITED STATES PATENTS

| | | | |
|---|---|---|---|
| 2,620,335 | 12/1952 | Neilsen et al.................... | 260/209 R |
| 2,697,701 | 12/1954 | Heritage et al................. | 260/209 R |
| 2,801,955 | 8/1957 | Rutenberg et al.............. | 260/209 R |
| 3,094,517 | 6/1963 | Stanley............................ | 260/209 R |
| 3,176,003 | 3/1965 | Stancioff........................ | 260/209 R |
| 3,236,833 | 2/1966 | Gordon et al................... | 260/209 R |
| 3,753,972 | 8/1973 | Yaphe et al.................... | 260/209 R |

*Primary Examiner*—Johnnie R. Brown
*Attorney, Agent, or Firm*—Larson, Taylor & Hinds

[57] ABSTRACT

It is known that an agar substance such as agar-agar and British agar may be produced by extracting such an agar-yielding red alga as *Gelidium subcostatum, Gracilaria Verrucosa, Chondrus crispus, Chondrus ocellata* and *Chondrus stellata* with water. According to this invention, the raw material alga is pre-treated by subjecting to the action of a screw-extruder before the extraction of the raw alga with water is carried out. Agar product of high quality may be produced according to this invention in an improved high yield but without lowering significantly the jelly strength of the agar product recovered.

12 Claims, No Drawings

3,901,873

PROCESS FOR THE PRODUCTION OF AGAR FROM A RED ALGA

This invention relates to a new process for the production of agar from an agar-yielding red alga.

It is known that some species of marine red algae, or Rhodophyta yield an agar, namely a gelatinous material known as agar-agar and British agar. Agar-agar is a gelatinous mixture comprising polysaccarides which is recovered by extracting such species of red alga as *Gelidium amansii*, *Gelidium subcostatum* and *Gracilaria verrucosa* with hot water or an aqueous diluted acid such as aqueous diluted sulfuric acid. British agar is a gelatinous complex mixture comprising polysaccharide sulfates which is known as carragheenin and which is recovered by extracting a red alga such as *Chondrus crispus*, *Chondrus ocellatus* and *Gigartina stellata* with hot water. Agar-agar and British agar have some unique, chemical and physical properties and large quantities of these agars have been utilised in foodstuff industry, chemical industry, pharmaceutical industry, scientific research and other many fields. Demand for agar is increasing in recent years.

Hithertofore, the production of agar-agar has been made by using a red alga species *Gelidium amansii* exclusively as the raw material and by extracting this alga raw material with hot water or an aqueous diluted acid. The alga *Gelidum amansii* is able to afford agar-agar of a high quality which shows a high jelly strength, in a favorable yield. However, the quantity of the alga *Gelidium amansii* which may be produced and supplied at the present time is very much small as compared to the present demand therefor. In these circumstances, the other species of red algae such as *Gelidium subcostatum* and *Gracilaria verrucosa* are currently used as a main substitute for the alga *Gelidium amansii* as the raw material in the production of agar-agar. When such species of red algae as *Gelidium subcostatum* and *Gracilaria verrucosa* are used as the raw material for the production of agar-agar and are extracted with hot water or an aqueous diluted acid as usually been done in the production of agar-agar from the species *Gelidium amansii*, however, it has been found that the yield of agar-agar recovered is very low and/or the agar-agar produced is of a poor quality and of a low jelly strength. Accordingly, such species of red alga as *Gelidium subcostatum* and *Gracilaria verrucosa* must be said to be a low grade of the raw material which are not very suitable for the production of agar-agar.

On the other hand, when British agar known as carragheenin is produced by extracting such species of red algae as *Chondrus crispus*, *Chondrus ocellatus* and *Gigartina stellata* with hot water or an aqueous diluted alkali as usually be done, it is usual that the yield of British agar recovered is relatively low, too.

In the production of agar-agar and British agar from the above-mentioned species of red algae which have currently been used as the raw material alga for the production of these agar substances, therefore, such a request occurs as to recover an agar substance of an acceptably high jelly strength in a high yield even from the raw material alga of a low grade from which an agar substance of a low quality would usually have been recovered. Unfortuantely, however, this request has encountered some conflicting problems: thus, when the raw material alga is extracted with water for the production of an agar substance therefrom, the efficiency or yield of extraction of the agar substance from the alga is generally low, although the jelly strength of the agar substance produced through this hot water extraction is then acceptably high, and on the other hand, when the raw material alga is extracted with aqueous diluted acid, the efficiency of extraction of the agar substance may be improved but the jelly strength of the agar-agar so obtained can inevitably be lowered. Furthermore, it has been found that any of the known methods of producing agar-agar from the alga *Gelidium amansii* are not able to afford an agar-agar of high jelly strength from the raw material alga of low grade such as *Gracilaria verrucosa* and *Gelidium subcostatum*. Funaki and Kojima have proposed a method according to which the raw material alga of low grade such as *Gracilaria verrucosa* and *Gelidium subcostatus* is pretreated with an aqueous alkali, for example, with an aqueous solution of 6% sodium hydroxide, before the extraction of the agar substance from the alga is performed (see the "Nihon Su-i-san Shi" 16, 401, 1951). This method of Funaki and Kojima can give a favorable result that an agar-agar of a high jelly strength may be produced even from the raw material alga of low grade, but yet this method is not entirely satisfactory in that its efficiency or yield of extraction of the agar substance is relatively poor. Consequently, all the known methods of producing agar-agar from the alga raw materials can necessarily suffer from a drawback that they are not able to utilise the raw material alga with a high efficiency, although they may exhibit some advantages in several points.

An object of the present invention is to provide a process of producing an agar substance from an agar-yielding red alga of a low grade such as *Gelidium subscostatum*, *Gracilaria verrucosa*, *Chondrus crispus*, *Chondrus ocellatus* and *Chondrus stellata* according to which an agar substance of a high jelly strength can be recovered in an improved yield but without lowering significantly the jelly strength of the agar product obtained.

It is known that a screw-type extruder has various operating functions such as shaping, mixing, smelting, compression and expansion, etc., and has widely been used in shaping of shaped articles of plastics and also in manufacturing shaped food products and structured proteinous food products. We have now found that the structure of the cell mass in a tissue of a variety of animals and vegetables can effectively be broken by subjecting said tissue to the action of a screw-type extruder. In the agar-yielding red algae, the agar substance is mainly present in the cell membrane and in the connective tissue between the cells of the algae. We have now found that when an agar-yielding red alga is treated by subjecting to the action of a screw-type extruder, the strongly bonded structure of the cell mass in the tissue of said alga is thoroughly disintegrated and the agar substance is converted into such conditions that the agar substance is more easily extractable with water.

According to the present invention, therefore, there is provided a process for the production of agar from an agar-yielding red alga which is *Gelidium subcostatum*, *Gracilaria verrucosa*, *Chondrus crispus*, *Chondrus ocellatus* or *Gigartina stellata*, comprising pretreating said alga by subjecting it to the action of a screw-type extruder, and then extracting the pretreated alga with water.

In the process of the present invention, there may be used any of the known types of screw-extruder which have been employed in the manufacture of shaped articles of resins and in the manufacture of shaped or structured food products. Not only a single-screw extruder but also a double-screw extruder may be employed for the pre-treatment of the red alga according to the present invention. With the particular alga species *Gelidium amansii* from which an agar-agar of a high jelly strength can normally be extracted in a high yield even by means of the known methods, the quantity of components which are extractable with hot water from this particular alga species can be increased when the alga has been pre-treated by means of the extruder. In this case, however, it has been observed that a portion of the agar substance present in this particular alga species *Gelidium amansii* can be degraded due to the pre-treatment with extruder, so that the yield of agar-agar recovered can be reduced a little than in the absence of the pre-treatment with the extruder. On the other hand, with such other species of red algae as *Gelidium subcostatum* and *Gracilaria verrucosa* from which only an agar-agar of a low jelly strength can normally been produced by the mere extraction with water, the quantity of components which are extractable with hot water can be increased and the agar-agar can be recovered therefrom with a favorable high jelly strength and in an improved yield, if these alga species have been pre-treated by means of the extruder. With such another species of red algae as *Chondrus cripus*, *Chondrus ocellatus* and *Gigartina stellata* from which British agar known as carragheenin is usually recovered, the pre-treatment of these species of red algae with the extruder is effective in improving the yield of British agar recovered therefrom without lowering significantly the jelly strength of the agar.

In view of the fact that the pre-treatment of the particular alga species *Gelidium amansii* with a screw-extruder can actually bring about a reduction in the yield of the agar-agar recovered therefrom as stated in the above, it is surprising and unique that the pre-treatment of such alga species as *Gelidium subcostatum*, *Gracilaria verrucosa*, *Chondrus crispus*, *Chondrus ocellatus* and *Gigartina stellata* with a screw-extruder according to the present invention can effectively increase the yield of the agar substance which is extracted with water from these algae.

In carrying out the process of the present invention, it is preferred that the alga should be pre-treated by subjecting to the action of a screw-extruder in the presence of free water and with application of heat in such a manner that the alga is passed through the extruder together with water while the barrel of the extruder is externally heated. Furthermore, it has been found that when the pre-treatment of the alga with the extruder is conducted, the presence of a proportion of an alkali added to the alga further improves the yield of the agar recovered and also further increases the jelly strength in the agar. The proportion of free water added to the alga may generally be within a range of from 25 to 40% by weight based on the dry weight of the alga employed. The proportion of alkali added to the alga may generally be within a range of from 0.1 to 0.8% by weight based on the dry weight of the alga employed. Suitable examples of alkali which may be used in the process of the present invention include sodium hydroxide. When sodium hydroxide is added as the alkali to the alga, the alkali may be added in the form of an aqueous solution containing sodium hydroxide at a relatively low concentration of 0.4% to 2.0% by weight. When the raw material alga is pre-treated by passing through the screw-extruder, the tissue of the alga so treated is disintegrated to give a pasty mass comprising the disintegrated alga body. This mass may be extracted with hot water or an aqueous diluted acid which may be, for example, an aqueous solution containing 0.01% to 0.05% by weight of sulfuric acid, so that the agar substance may be extracted out of said mass. The resulting aqueous extract containing the agar substance may, if desired, be treated by adding thereto a water-immiscible lower aliphatic alcohol such as butyl alcohol or isopropyl alcohol to precipitate the agar substance from the extract, so that the agar substance may be more or less purified. The precipitated agar substance may be removed from the mother liquor by filtration or centrifugation.

Any known type of screw-extruder, either of a single-screw type or of a double-screw type (twin-screw type), may be used for the pre-treatment of the raw material alga in accordnace with the present invention. Of course, however, the length and diameter of the screw, shapes and dimensions of groove in the screw, pitch and width of the thread, compression ratio and rotation speed of the screw, structure of the barrel, heating performance and compression performance of the barrel and other factors of design of the extruder employed, as well as temperature and duration of the treatment and the amount of free water present and other operating conditions are correlated to each other in participating in the process and must suitably be chosen. But optimum selection of these factors of mechanical design of the extruder as well as optimum selection of the factors of the condition of operating the process may readily be achieved by the skilled in the art by carrying out a series of preliminary experiments. Accordingly, it is feasible and ready for the skilled in the art to employ a screw-extruder of such a design by which the pre-treatment of the alga and hence the whole process according to the present invention can be performed with success.

A series of tests was made to demonstrate how the process of the present invention brings about the merits over the methods of the prior art. The test procedures employed were as follows:

An amount of *Gracilaria verrucosa* from the Argentine was divided into four portions which were then well rinsed with water and taken as the raw alga samples (I), (II), (III) and (IV), respectively.

i. Pre-treatment of the Raw Alga Samples

The alga sample (I) was such one which had been merely rinsed with water without any further treatment.

The alga sample (II) was pre-treated by adding to the rinsed alga sample an aqueous solution of 6% sodium hydroxide in a proportion of 20 parts by weight of the aqueous sodium hydroxide to 1 part of the alga sample, allowing the mixture to stand for 1 hour at 80°–85°C for the alkali treatment, well washing the so treated alga with water, immersing the alga in water for about 12 hours and finally draining water from the alga.

The alga sample (III) was pre-treated by adding to the rinsed alga sample uniformly an amount of water in a proportion of 0.35 parts by weight of water to 1 part of the alga, and then passing the alga together with the water through a single-screw type of extruder.

The alga sample (IV) was pre-treated by adding to the rinsed alga sample uniformly an 1/5-N aqueous solution of sodium hydroxide in a proportion of 0.35 parts by weight of the aqueous sodium hydroxide to a part of the alga, and then passing the mixture through an extruder of the same type as employed in the pre-treatment of the agar sample (III).

ii. Extraction of Agar From the Alga Samples

The above-mentioned alga samples (I), (II), (III) and (IV) which had been pre-treated in the different ways as mentioned above were then extracted with a 3.5-fold quantity of an 1/500-N aqueous solution of sulfuric acid added thereto for 45 minutes under a steam pressure of 0.5 kg/cm$^2$., so that the agar substance was extracted out of the alga samples.

iii. Efficiency of Extraction of Agar

Efficiency of extraction of agar was calculated by determining percentage of the weight of the solid content present in the agar substance as recovered by the above-mentioned extraction process, on the basis of the weight of the rinsed alga sample employed.

iv. Measurement of Jelly Strength of the Agar

A jelly mass containing 1.5% by weight of the recovered agar-agar (based on the dry weight) was prepared from each of the extracted agar substances and was then measured in a curd meter fitted with a loading piston of 5.6 mm in diameter. The reading of the curd meter was taken as the jelly strength.

The results of tests obtained are summarised in Table 1 below.

TABLE 1

| Sample No. | Process of pre-treating the raw alga sample | Efficiency (%) of extraction of agar substance | Jelly strength (g.) |
|---|---|---|---|
| (I) | Merely rinsed with water | 14.8 | 12 |
| (II) | Pre-treated with an aqueous solution of 6% sodium hydroxide | 13.7 | 78 |
| (III) | Pre-treated with screw-extruder in the presence of water added (according to the present invention) | 31.1 | 44 |
| (IV) | Pre-treated by screw-extruder after the addition of a 0.35-fold quantity of the 1/5-N aqueous sodium hydroxide (according to a preferred embodiment of the present invention) | 34.2 | 74 |

From the comparison between the results shown in the above Table, it may be seen that the pre-treatment of the raw material alga with the extruder according to the present invention evidently improves both the efficiency of extraction of the agar and the jelly strength of the agar obtained and also that the pre-treatment of the raw material alga with the extruder in the presence of an alkali added according to a preferred embodiment of the present invention further improve the jelly strength of the agar obtained. Thus, it is seen that the pre-treatment of the raw alga species *Gracilaria verru-* *cosa* with the extruder according to the present invention advantageously enables the efficiency of extraction of the agar-agar to be improved two times or more than the current method of pre-treating the raw material alga with an aqueous alkali alone, when it is applied to the alga species *Gracilaria verrucosa* which is frequently emloyed as the raw material in the production of agar-agar at present. Furthermore, it is seen that the presence of an alkali added during the pre-treatment of the raw alga species *Gracilaria verrucosa* with the extruder according to the preferred embodiment of the present invention is more advantageously effective in improving both the efficiency of extraction of the agar-agar and the jelly strength of the agar-agar obtained from said alga species. Similar results have been obtained when the process of the present invention has been applied to the other alga species *Gelidium subcostatum*.

Accordingly, the process of the present invention is effective in producing agar-agar of a high jelly strength with a high efficiency of extraction from such alga species of low grade as *Gracilaria verrucosa* and *Gelidium subcostatum* from which agar-agar would have usually been produced with a low efficiency of extraction by the known methods of producing the agar-agar.

The present invention is now illustrated with reference to the following examples to which the present invention is not limited in any way.

EXAMPLE 1

A red alga species *Gracilaria verrucosa* from the Argentine was well rinsed with water and then dried to a water content of 12.3% by weight. To 10 kg. of this alga species so dried was added 3.5 kg. of an 1/5-N aqueous solution of sodium hydroxide, and the resulting admixture was then well agitated so that the solution of sodium hydroxide is uniformly distributed among the alga bodies. The admixture was pre-treated by passing through a single-screw extruder of such a design that the compression ratio of its screw was 6.7, the screw diameter was 50–60 mm. and the screw length was 522 mm. and its barrel was of a spiral structure, and under such operating conditions that the screw rotation speed was at 300 r.p.m., the temperature of the heated barrel was at 114°C and the pressure in the front of the screw tip was at 20 kg/cm$^2$. During the passage through the extruder, the alga bodies were disintegrated to give 11.6 Kg. of a pasty mass of the disintegrated alga containing 26% by weight of water.

To 1 kg. of the pasty mass of the disintegrated alga so obtained was added 3.5 kg. of an aqueous 1/500-N solution of sulfuric acid, and the resulting mixture was placed in an autoclave and heated in this autoclave for 45 minutes at a temperature of 111°C under a pressure of 0.5 kg/cm$^2$, so that the extraction of agar-agar from the alga took place. The aqueous extract so obtained was adjusted to a neutral pH by addition of hydrochloric acid and then dehydrated by a conventional drying method to give 0.28 kg. of an agar-agar product containing 11% of water. The yield of the agar-agar product was 33% by weight on the basis of the weight of the water-rinsed raw alga. The jelly strength of the agar-agar product was 72 g. as measured at a solid content of 1.5% using a curd meter fitted with a loading piston of 5.6 mm. in diameter.

EXAMPLE 2

A red alga species *Gelidium subcostatum* was well rinsed with water and then dried to a water content of 11.8% by weight. To 10 kg. of this alga species so dried was added 3.5 kg. of an aqueous 1/5-N solution of sodium hdyroxide, and the resulting admixture was well agitated so that the sodium hydroxide solution was uniformly distributed among the bodies of the alga. The admixture was then pre-treated by passing through a single-screw extruder of such a design that the compression ratio of its screw was 5.2, the screw diameter was 50–60 mm., the screw length was 522 mm. and its barrel was of a spiral structure, and under such operating conditions that the rotation speed of the screw was at 400 r.p.m., the temperature of the heated barrel was at 111°C and the pressure in the front of the screw tip was at 20 kg/cm$^2$. By this passage through the extruder, the alga bodies were roughly disintegrated to give 11.4 kg. of a pasty mass of the disintegrated alga containing 24% by weight of water.

This pasty mass of the disintegrated alga so obtained was then extracted with an aqueous 1/500-N solution of sulfuric acid in the same manner as in Example 1, to give an agar-agar product. The yield of the agar-agar product was 46% by weight on the basis of the weight of the rinsed raw alga. The jelly strength of a gell mass prepared from this agar product was 68 g. as measured at a solid content of 1.5% by weight using a curd meter fitted with a loading piston of 5.6 mm. in diameter. For comparison, the above procedure was repeated except that the alga to which the aqueous sodium hydroxide had been added was immediately extracteed with the aqueous solution of sulfuric acid without conducting the pre-treatment with the screw-extruder. In this case, the yield of the agar-agar product obtained was 21% by weight, and the jelly strength of a gell mass prepared from this agar product was 73 g.

EXAMPLE 3

A red alga species *Gigartina stellata* known as Irish moss was well rinsed with water and then dried to a water content of 14.5% by weight. 10 kg. of the alga so dried was sliced into small pieces of about 2 mm. wide to which 2.5 kg. of water was then added by spraying water uniformly over the alga pieces. The wetted alga pieces were pre-treated by passing through a single-screw extruder of such a design that the compression ratio of its screw was 5.2, the screw length was 522 mm., the screw diameter was 50–60 mm., and its barrel was of a spiral structure, and under such operation conditions that the rotation speed of the screw was at 450 r.p.m., the temperature of the heated barrel was at 111°C and the pressure in the front of the screw tip was at 20 kg./cm$^2$. By this passage through the extruder, the alga pieces were roughly disintegrated to give 11 kg. of a pasty mass of the disintegrated alga bodies containing 23% by weight of water.

To 1 kg. of the pasty mass of the disintegrated alga so obtained was added 30 kg. of water, and the resulting mixture was heated at 90°C for 2 hours under agitation during which the extraction of carragheenin from the alga took place. The mixture was then filtered to give 28 kg. of a viscous extract as the filtrate.

This extract was subsequently mixed with 56 kg. of aqueous 85% isopropyl alcohol to precipitate the agar substance from the extract. The precipitate was removed by filtration, drained and dried in air at 65°C to give 367 g. of a carragheenin product containing 7.6% by weight of water.

For comparison, further 10 kg. of the water-rinsed and dried alga species *Gigartina stellata* was processed in the same manner as described above in this example, except that the pre-treatment with the extruder was omitted. Similarly, a carragheenin product was obtained. The yields of the carragheenin products so obtained were calculated on the basis of the weight of the water-rinsed and dried raw alga employed. Viscosity of an aqueous solution containing 0.5% by weight of each carragheenin product was determined at 25°C using a Brookfield viscosimeter. Furthermore, a jelly strength of a gell mass prepared from an aqueous solution of 1.5% by weight of each carragheenin product was measured at 10°C using a curd meter fitted with a loading piston of 5.6 mm. in diameter. The results of tests obtained are shown in Table 2 below.

TABLE 2

| Raw material alga | Yield (%) of agar product | Viscosity (centi-poise) | Jelly strength (g.) |
|---|---|---|---|
| Pre-treated with the extruder according to the present invention | 43.6 | 218 | 94 |
| Not pre-treated with the extruder (comparative) | 34.3 | 240 | 89 |

The preceding examples can be repeated with similar success by substituting the generically or specifically described red alga species as the raw material and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What we claim is:

1. A process for the production of agar from an agar-yielding red alga which is selected from the group consisting of *Gelidium subcostatum*, *Gracilaria verrucosa*, *Chondrus crispus*, *Chondrus ocellata* or *Gigartina stellata*, comprising pre-treating said alga by subjecting it to the action of a screw-type extruder in the presence of added water to break the structure in the red alga tissue to render strongly bonded agar substance in the tissue more easily extractable with water, and then extracting the pre-treated alga with water.

2. A process as claimed in claim 1 in which the water added to the alga contains sodium hydroxide.

3. A process as claimed in claim 1 in which the pre-treated alga is extracted with hot water.

4. A process as claimed in claim 1 in which the pre-treated alga is extracted with hot water containing sulfuric acid.

5. A process as claimed in claim 1 in which the pre-treated alga is extracted with hot water and the resulting aqueous extract is added with isopropyl alcohol to precipitate the agar substance from the extract, and the agar substance precipitated is removed by filtration.

6. A process as claimed in claim 1 in which a red alga species *Gelidium subcostatum* is pre-treated with a screw-type extruder in the presence of aqueous sodium hydroxide which had previously been admixed with the alga.

7. A process as claimed in claim 1 in which a red alga species *Gracilaria verrucosa* is pre-treated with a screw-type extruder in the presence of aqueous sodium hydroxide which had previously been admixed with the alga.

8. A process as claimed in claim 1 in which the red alga species is Irish moss, the mass of the Irish moss pre-treated is then extracted with hot water, the resulting aqueous extract is admixed with isopropyl alcohol to precipitate British agar substance from the extract, and this precipitated agar substance is removed out of the mother liquor.

9. The improvement as claimed in claim 1 in which the screw-type extruder is a single-score extruder.

10. The improvement as claimed in claim 1 in which the amount of water added to the alga is within a range of 25 to 40% by weight based on the dry weight of the alga.

11. The improvement as claimed in claim 2 in which the water added to the alga contains sodium hydroxide in a concentration of 0.4–2.0% by weight of the water.

12. The improvement as claimed in claim 1 in which the barrel of the extruder is heated externally.

* * * * *